(12) United States Patent
Wagner

(10) Patent No.: US 9,425,444 B2
(45) Date of Patent: Aug. 23, 2016

(54) TRACTION BATTERY ASSEMBLY WITH PLENUM ARRANGED TO PROMOTE DEVELOPMENT OF MORE UNIFORM PRESSURE THEREIN

(75) Inventor: Thomas A. Wagner, Ann Arbor, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 744 days.

(21) Appl. No.: 13/350,896

(22) Filed: Jan. 16, 2012

(65) Prior Publication Data
US 2013/0183563 A1 Jul. 18, 2013

(51) Int. Cl.
| | |
|---|---|
| H01M 10/50 | (2006.01) |
| H01M 2/10 | (2006.01) |
| B60K 1/04 | (2006.01) |
| H01M 10/625 | (2014.01) |
| H01M 10/6563 | (2014.01) |
| H01M 10/6557 | (2014.01) |
| H01M 10/613 | (2014.01) |
| B60K 11/06 | (2006.01) |
| B60K 1/00 | (2006.01) |

(52) U.S. Cl.
CPC .............. *H01M 2/1077* (2013.01); *B60K 1/04* (2013.01); *H01M 10/613* (2015.04); *H01M 10/625* (2015.04); *H01M 10/6557* (2015.04); *H01M 10/6563* (2015.04); *B60K 11/06* (2013.01); *B60K 2001/005* (2013.01); *H01M 2220/20* (2013.01)

(58) Field of Classification Search
CPC .............. B60K 11/06; H01M 2220/20; H01M 10/613; H01M 10/625; H01M 10/6563
See application file for complete search history.

(56) References Cited

U.S. PATENT DOCUMENTS

| | | | |
|---|---|---|---|
| 6,479,185 B1 | 11/2002 | Hilderbrand et al. | |
| 2009/0017366 A1 | 1/2009 | Wood et al. | |
| 2011/0177367 A1* | 7/2011 | Chung et al. | 429/83 |
| 2011/0229749 A1* | 9/2011 | Kim et al. | 429/120 |

FOREIGN PATENT DOCUMENTS

JP 2008201371 A2 9/2008

* cited by examiner

*Primary Examiner* — Mark F Huff
*Assistant Examiner* — Monique Wills
(74) *Attorney, Agent, or Firm* — David B. Kelley; Brooks Kushman P.C.

(57) ABSTRACT

A vehicle battery assembly includes a housing defining a plenum having an inlet, and a plurality of battery cells disposed within the housing. The plenum has an effective cross-sectional area that decreases as a distance from the inlet increases and is arranged to promote development of generally uniform pressure within the plenum.

6 Claims, 3 Drawing Sheets

US 9,425,444 B2

TRACTION BATTERY ASSEMBLY WITH PLENUM ARRANGED TO PROMOTE DEVELOPMENT OF MORE UNIFORM PRESSURE THEREIN

TECHNICAL FIELD

This disclosure relates to the cooling of battery arrays used in powering vehicles, such as plug-in hybrid electric vehicles (PHEVs), in which air may be directed through gaps between cells within the arrays.

BACKGROUND

An electrified vehicle (e.g., hybrid, plug-in hybrid, battery electric, etc.) includes a battery pack having one or more cells electrically connected together. These cells store energy that may be used to move the vehicle. For example, the cells may be electrically connected with an electric machine that transforms electrical energy to mechanical energy to move the vehicle, and mechanical energy to electrical energy to be stored by the cells. Providing energy to or removing energy from the cells may cause them to generate heat. This heat, if not properly dissipated, may interfere with the proper operation of the battery pack.

SUMMARY

A battery assembly includes a housing defining a plenum having an inlet, a plurality of battery cells disposed within the housing, and a wedge disposed within the plenum. The plenum and wedge cooperate such that an effective cross-sectional area of the plenum decreases as a distance from the inlet increases to promote development of generally uniform pressure within the plenum. The wedge may be triangularly shaped. The battery cells may be arranged within a row and evenly spaced apart. Adjacent pairs of cells may define gaps therebetween in fluid communication with the plenum. Generally uniform flow of air through the gaps may be promoted in response to the development of generally uniform pressure within the plenum.

A vehicle includes an electric machine that generates motive power for the vehicle and a battery assembly. The battery assembly includes a plurality of battery cells electrically connected with the electric machine. The battery assembly also includes a plenum having an inlet in fluid communication with a source of air and an effective cross-sectional area that decreases as a distance from the inlet increases. The plenum is arranged to promote development of generally uniform air pressure therein. The battery assembly may include a wedge disposed within the plenum and shaped to alter the effective cross-sectional area of the plenum. The wedge may be triangularly shaped. The plurality of battery cells may be arranged within a row and evenly spaced apart. Adjacent pairs of the cells may define gaps therebetween in fluid communication with the plenum. Generally uniform flow of the air through the gaps may be promoted in response to the development of generally uniform air pressure within the plenum.

A battery assembly includes a housing defining a plenum having an inlet and a plurality of battery cells disposed within the housing. The plenum has an effective cross-sectional area that decreases as a distance from the inlet increases and is arranged to promote development of generally uniform pressure therein. The battery assembly may include a wedge disposed within the plenum and shaped to alter the effective cross-sectional area of the plenum. The wedge may be triangularly shaped. The plurality of battery cells may be arranged within a row and evenly spaced apart. Adjacent pairs of the cells may define gaps therebetween in fluid communication with the plenum. Generally uniform flow of air through the gaps may be promoted in response to the development of generally uniform pressure within the plenum.

DETAILED DESCRIPTION

Embodiments of the present disclosure are described herein; however, it is to be understood that the disclosed embodiments are merely examples and other embodiments may take various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention. As those of ordinary skill in the art will understand, various features illustrated and described with reference to any one of the figures may be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, may be desired for particular applications or implementations.

Uniform cooling of cells within an automotive battery system may improve battery performance and reduce cooling fan power requirements. As the number of cells in an array increases, however, providing uniform air flow throughout the stack becomes increasingly difficult. This may be especially true when vehicle packaging requirements limit inlet plenum volume, which can promote noticeable pressure differences therein. Such pressure differences in, for example, a conventional twenty eight cell array may result in significant variations in air velocities around cells at different locations in the stack. Reduced air flow around some cells may result in lower current densities, degraded performance, etc.

Figure 1:
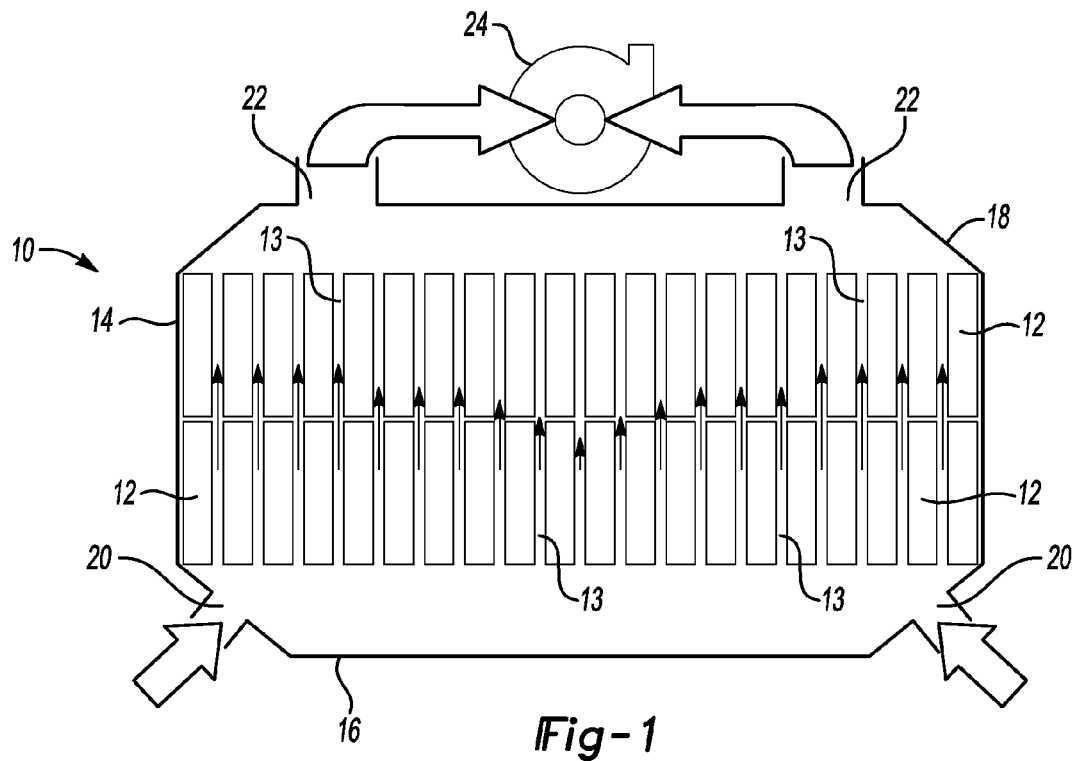
FIGS. 1 and 2 are diagrammatic views of traction battery assemblies.

FIG. 1 diagrammatically depicts a battery assembly 10 with two rows of battery cells 12. The cells 12 of each row are equally spaced apart. Hence, gaps 13 between the cells 12 of the same row are generally equal. The cells 12 are surrounded by a housing assembly 14 that further defines an inlet plenum 16 and outlet plenum 18. In the example of FIG. 1, the inlet plenum 16 includes two air inlets 20 in fluid communication with a source of air and the outlet plenum 18 includes two air outlets 22 in fluid communication with a blower 24. The blower 24 is arranged to pull air through the assembly 10. That is, cooling air typically enters the assembly 10 through the inlets 20, passes through the inlet plenum 16 and gaps 13, and exits the assembly 10 by way of the outlet plenum 18 and outlets 22.

Analysis indicates that the gaps 13 located proximate to the inlets 20 experience greater air flow velocities relative to the gaps 13 located distant from the inlets 20. The pressure within the inlet plenum 16 decreases as a function of distance from the inlets 20. Hence, inlet plenum pressure is at a maximum near the inlets 20 and at a minimum approximately half way between the inlets 20. The gaps 13 exposed to these lesser inlet plenum pressures will generally experience decreased flow velocities relative to the gaps 13 exposed to greater inlet plenum pressures because the gaps 13 are of equal width.

Decreased flow velocities result in less cell cooling. A speed of the blower 24 may be increased to account for the reduced cooling experienced by the cells 12 located near the center of the assembly 10. Increases in power consumption by the blower 24 associated with increased blower speed, however, may be undesirable. Furthermore, for a given inlet flow velocity, increased inlet plenum volume may reduce differences in pressure within the inlet plenum. Packaging constraints and cost, however, may restrict inlet plenum size.

Figure 2:
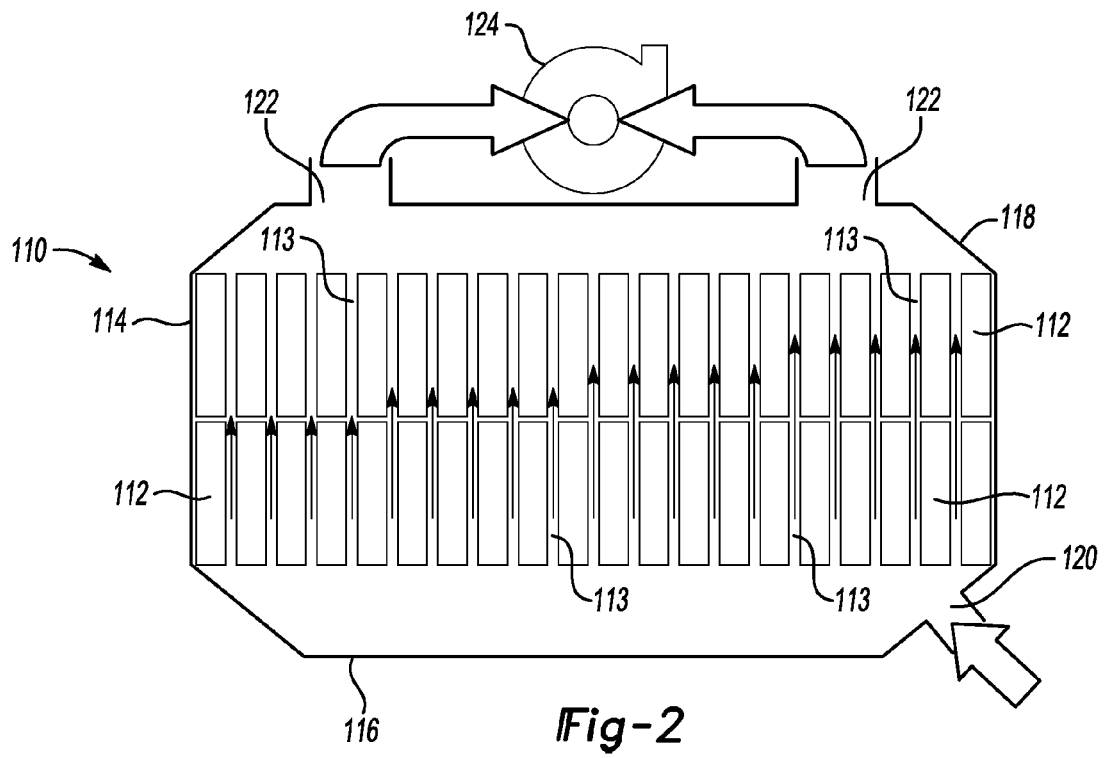

FIG. 2 diagrammatically depicts a battery assembly 110 with two rows of battery cells 112. The cells 112 within each row are equally spaced apart. Hence, gaps 113 between the cells 112 of the same row are generally equal. The cells 112 are surrounded by a housing assembly 114 that further defines an inlet plenum 116 and outlet plenum 118. In the example of FIG. 2, the inlet plenum 116 includes a single air inlet 120 in fluid communication with a source of air and the outlet plenum 118 includes two air outlets 122 in fluid communication with a blower 124. The blower 124 is arranged to pull air through the assembly 110. For the reasons explained with reference to FIG. 1, the cells 112 distant from the inlet 120 experience reduced cooling relative to the cells 112 proximate to the inlet 120.

Certain battery assemblies described herein may be configured to reduce uneven cell cooling. An inlet plenum, for example, may be shaped and arranged to promote more uniform pressures therein. More uniform plenum pressures may promote more uniform flow of air through the stack.

Figure 3:
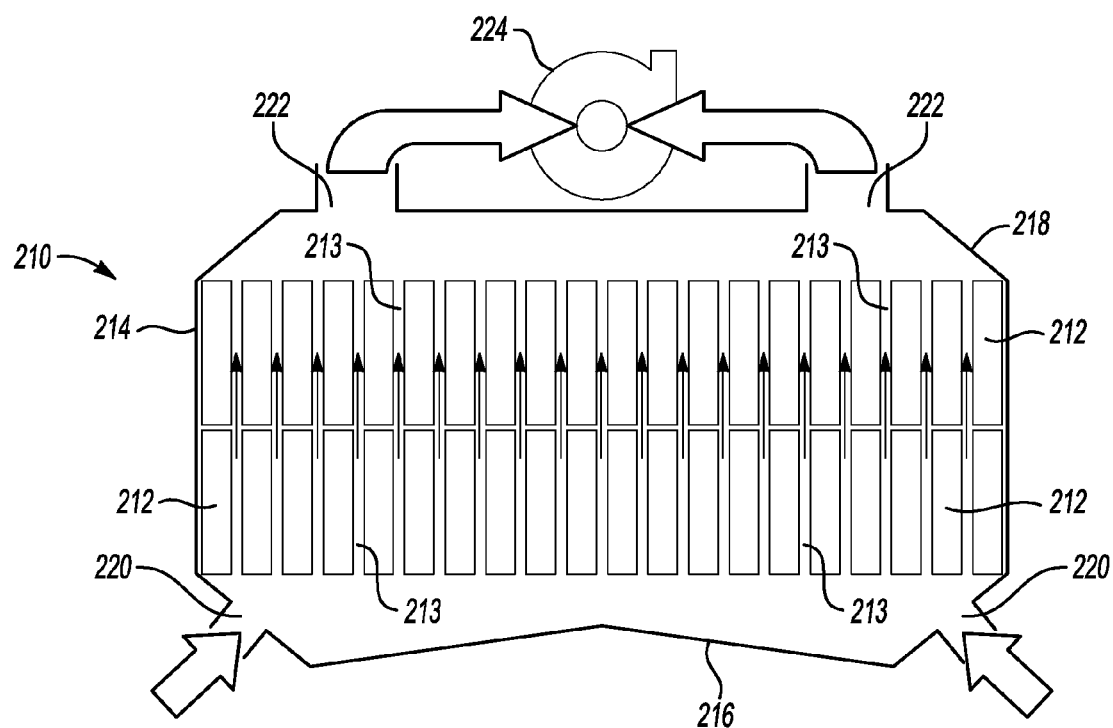
FIGS. 3 and 4 are diagrammatic views of traction battery assemblies with inlet plenums shaped and arranged to promote development of more uniform pressures therein.

FIG. 3 diagrammatically depicts a battery assembly 210 with two rows of cells 212. In other examples, a greater or fewer number of rows may be present and/or multiple such rows may be stacked one on top of the other (e.g., into the page, out of the page, etc.) Other cell arrangements are also contemplated. The cells 212 are surrounded by a housing assembly 214 that includes an inlet plenum 216 and outlet plenum 218. The plenums 216, 218 in other examples, however, may be separate from and attached to the housing 214, etc. In the example of FIG. 3, the inlet plenum 216 includes two air inlets 220 in fluid communication with a source of air and the outlet plenum 218 includes two air outlets 222 in fluid communication with a blower 224. Any suitable number of inlets/outlets, however, may be used. The blower 224 is arranged to pull air through the assembly 210. In other embodiments, the blower 224 may be positioned upstream of the inlets 220 to push air through the assembly 210, etc.

The inlet plenum 216 is shaped and arranged so as to promote the development of a pressure therein that is more uniform compared with, for example, the inlet plenum 16 of FIG. 1. That is, the inlet plenum 216, in this example, decreases in effective cross-sectional area as a distance from each of the inlets 220 increases until a minimum effective cross-sectional area is achieved about half way between the inlets 220. The decrease in effective cross-sectional area is illustrated as a decrease in distance from the cells 212 to a wall of the inlet plenum 216. This reduction in plenum volume in regions distant from the inlets 220 relative to regions proximate to the inlets 220 serves to offset pressure drops that may be otherwise experienced by plenums shaped similar to the inlet plenum 16. An optimum shape of the inlet plenum 216 to achieve a more uniform pressure therein may depend on the expected flow rate of air into the inlet plenum 216, the size of the battery assembly 210, the number of cells 212, etc., and may be determined via testing or simulation. A more uniform pressure within the inlet plenum 216, as suggested above, may promote more uniform flow of air through the gaps 213.

Figure 4:
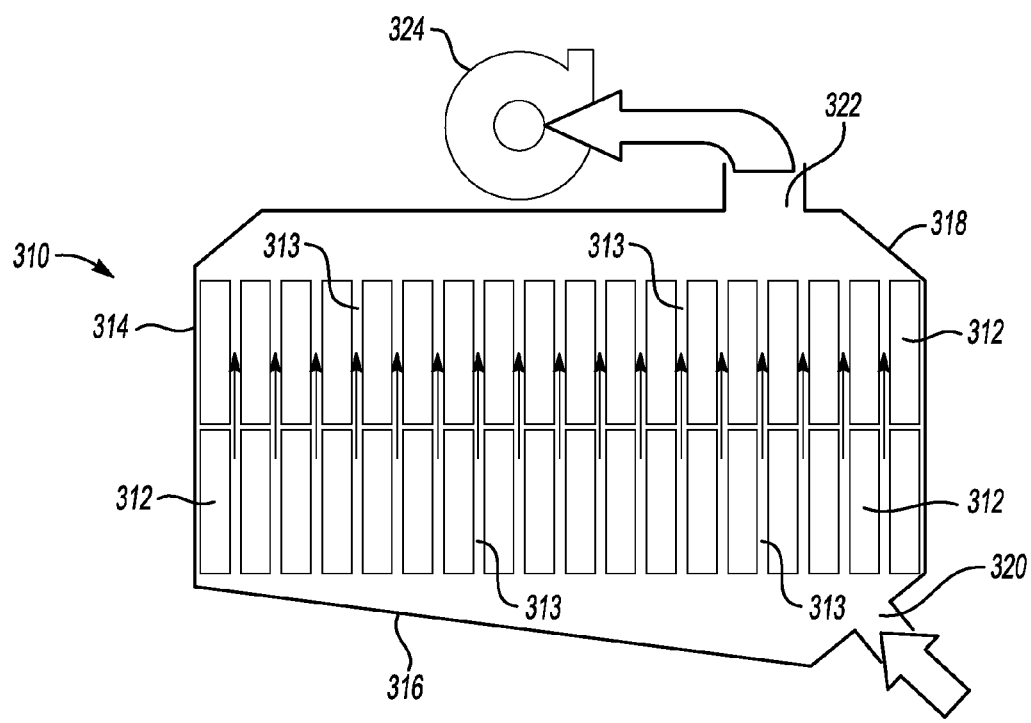

FIG. 4 diagrammatically depicts a battery assembly 310 with two rows of cells 312. As mentioned above, however, other cell arrangements are also possible. The cells 312 are surrounded by a housing assembly 314 that further defines an inlet plenum 316 and outlet plenum 318. In the example of FIG. 4, the inlet plenum 316 includes a single air inlet 320 in fluid communication with a source of air and the outlet plenum 318 includes a single air outlet 322 in fluid communication with a blower 324. The blower 324 is arranged to pull air through the assembly 310. In other embodiments, the blower 324 may be positioned upstream of the inlets 320 to push air through the assembly 310, etc.

The inlet plenum 316 is shaped and arranged so as to promote the development of a pressure therein that is more uniform compared with, for example, the inlet plenum 116 of FIG. 2. Similar to the example of FIG. 3, the inlet plenum 316 decreases in effective cross-sectional area as a distance from the inlet 320 increases. The decrease in effective cross-sectional area is again illustrated as a decrease in distance from the cells 312 to a wall of the inlet plenum 316. A desired shape of the inlet plenum 316 to achieve a more uniform pressure therein may depend on the expected flow rate of air into the inlet plenum 316, the size of the battery assembly 310, the number of cells 312, etc., and may be determined via testing or simulation.

Rotating the page upon which FIG. 4 is illustrated into the landscape position, yet another example is presented in which fifteen rows of cells 312 are stacked one on top of the other. An effective cross-sectional area within the inlet plenum 316 decreases as a distance from the inlet 320 increases to promote the development of a generally uniform pressure therein. Other arrangements are also contemplated.

Figure 5:
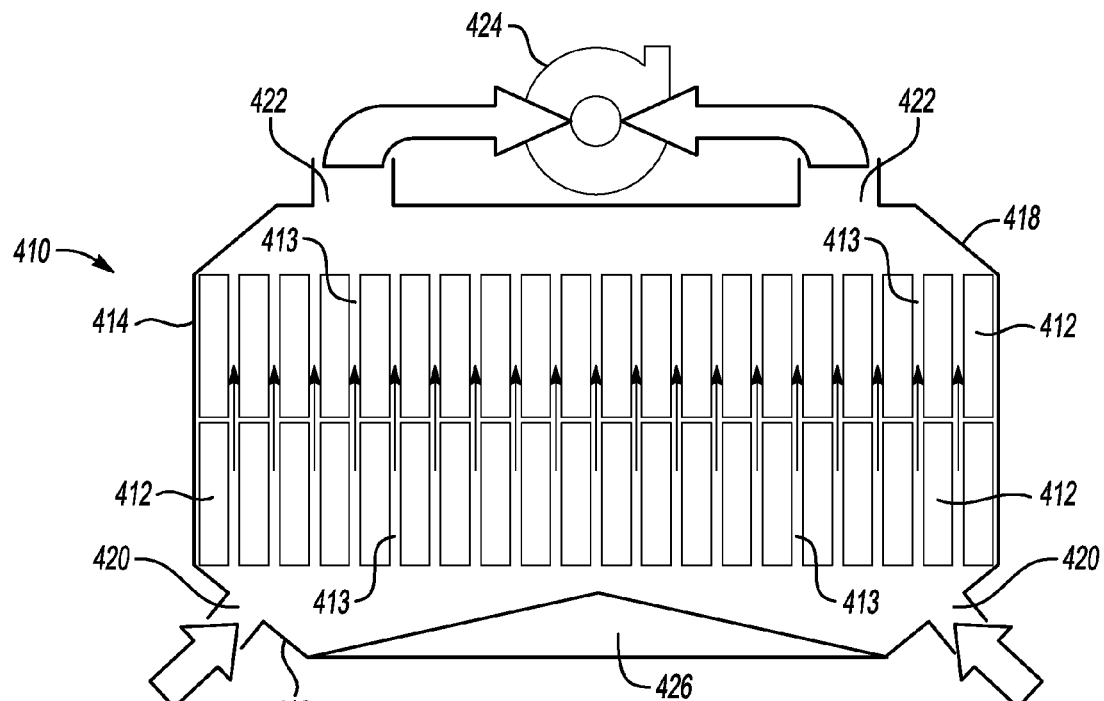
FIG. 5 is a diagrammatic view of a traction battery assembly including a wedge that cooperates with the assembly's plenum to promote development of more uniform pressure within the assembly's plenum.

FIG. 5 diagrammatically depicts a battery assembly 410 with two rows of cells 412. The cells 412 are surrounded by a housing assembly 414 that includes an inlet plenum 416 and outlet plenum 418. The inlet plenum 416 includes two air inlets 420 in fluid communication with a source of air (not shown) and the outlet plenum 418 includes two air outlets 422 in fluid communication with a blower 424. The blower 424 is arranged to pull air through the assembly 410.

The inlet plenum 416, in the example of FIG. 5, includes a triangularly shaped wedge 426 disposed therein. The wedge 426 thus reduces an effective cross-sectional area within the inlet plenum 416 as a distance from each of the inlets 420 increases until a minimum cross-sectional area is achieved about half way between the inlets 420. Hence, the wedge 426 cooperates with the plenum 416 so as to promote the development of a pressure within the plenum 416 that is more uniform compared with, for example, the inlet plenum 16 of FIG. 1. A desired shape of the wedge 426 to promote the development of a more uniform pressure within the inlet plenum 416 may depend on the expected flow rate of air into the inlet plenum 416, the size of the battery assembly 410, the number of cells 412, etc., and may be determined via testing or simulation. An appropriately shaped wedge may also be disposed within, for example, the inlet plenum 116 of FIG. 2 to promote the development of a more uniform pressure therein. Other arrangements are also contemplated.

The wedge 426 may be inserted into the inlet plenum 416 prior to assembly. Any suitable/known technique, however, may be used for arranging the wedge 426 within the inlet plenum 416.

Figure 6:
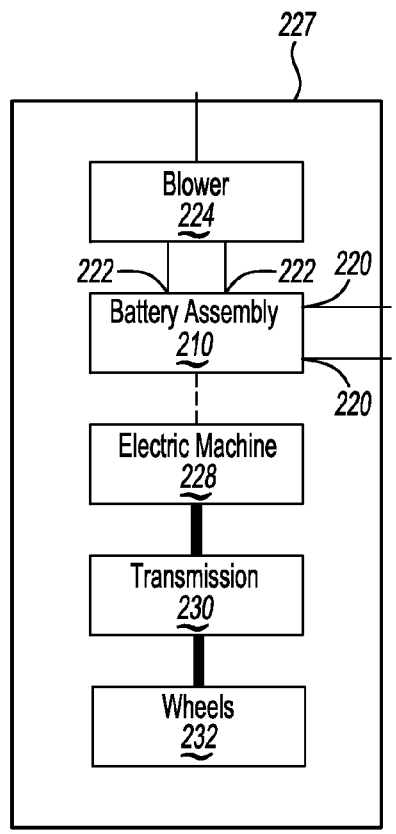
FIG. 6 is a diagrammatic view of an alternatively powered vehicle including the traction battery assembly of FIG. 3.

FIG. 6 diagrammatically depicts an alternatively powered vehicle 227 including the battery assembly 210 and blower 224 described above. The vehicle 227 further includes an electric machine 228, transmission 230, and wheels 232. The battery assembly 210 is in fluid communication with the blower 224 as indicated by thin solid line and is electrically connected with the electric machine 228 as indicated by dashed line. The transmission 230 is mechanically connected with the electric machine 228 and wheels 232 as indicated by thick solid line. Electrical energy from the battery assembly 210 may be transformed to mechanical energy by the electric machine 228 to move the wheels 232 via the transmission 230. Likewise, mechanical energy from the transmission 230 may be transformed to electrical energy by the electric machine 228 and stored by cells of the battery assembly 210.

The air inlets 220 and blower 224, in this example, are in fluid communication with an outside of the vehicle 227 as indicated by thin solid line. Hence, the blower 224 may pull ambient air through the battery assembly 210. Other arrangements, however, are also possible.

While exemplary embodiments are described above, it is not intended that these embodiments describe all possible forms encompassed by the claims. The words used in the specification are words of description rather than limitation, and it is understood that various changes may be made without departing from the spirit and scope of the disclosure and claims. As previously described, the features of various embodiments may be combined to form further embodiments of the invention that may not be explicitly described or illustrated. While various embodiments may have been described as providing advantages or being preferred over other embodiments or prior art implementations with respect to one or more desired characteristics, those of ordinary skill in the art recognize that one or more features or characteristics may be compromised to achieve desired overall system attributes, which depend on the specific application and implementation. These attributes may include, but are not limited to: cost, strength, durability, life cycle cost, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and may be desirable for particular applications.

What is claimed is:

1. A battery assembly comprising:
   a housing defining a body and a plenum having an inlet;
   a plurality of battery cells each having an end portion and disposed within the body; and
   a wedge disposed within the plenum adjacent to the end portions, the plenum and wedge cooperating such that an effective cross-sectional area of the plenum decreases as a distance from the inlet increases to promote development of generally uniform pressure within the plenum.

2. The assembly of claim 1 wherein the wedge is triangularly shaped.

3. The assembly of claim 1 wherein the plurality of battery cells are arranged within a row and evenly spaced apart, wherein adjacent pairs of the cells define gaps therebetween in fluid communication with the plenum, and wherein generally uniform flow of air through the gaps is promoted in response to the development of generally uniform pressure within the plenum.

4. A vehicle comprising:
   an electric machine configured to generate motive power for the vehicle; and
   a battery assembly including (i) a housing defining a body and a plenum having an inlet in fluid communication with a source of air, (ii) a plurality of battery cells each having an end portion, disposed within the body, and electrically connected with the electric machine, and (iii) a wedge disposed within the plenum adjacent to the end portions, the plenum and wedge cooperating such that an effective cross-sectional area of the plenum decreases as a distance from the inlet increases to promote development of generally uniform air pressure within the plenum.

5. The vehicle of claim 4 wherein the wedge is triangularly shaped.

6. The vehicle of claim 4 wherein the plurality of battery cells are arranged within a row and evenly spaced apart, wherein adjacent pairs of the cells define gaps therebetween in fluid communication with the plenum, and wherein generally uniform flow of the air through the gaps is promoted in response to the development of generally uniform air pressure within the plenum.

* * * * *